(No Model.)  2 Sheets—Sheet 1.
P. E. ROGERS.
SEEDING MACHINE.
No. 334,396. Patented Jan. 12, 1886.
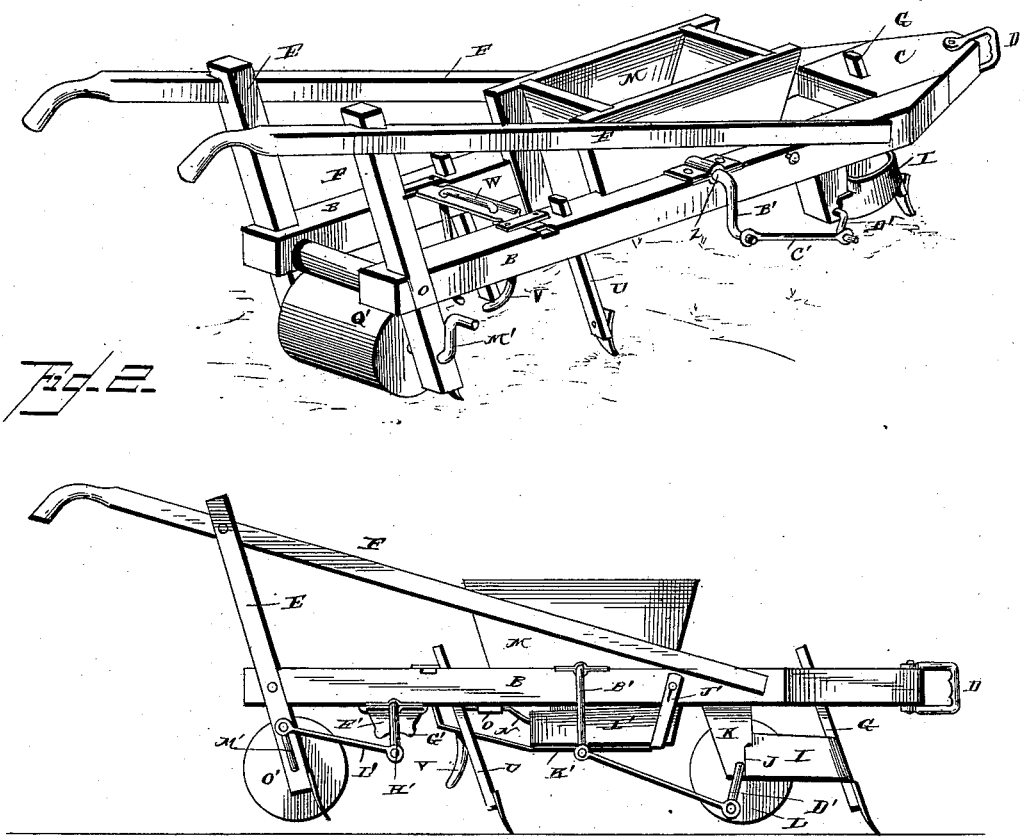
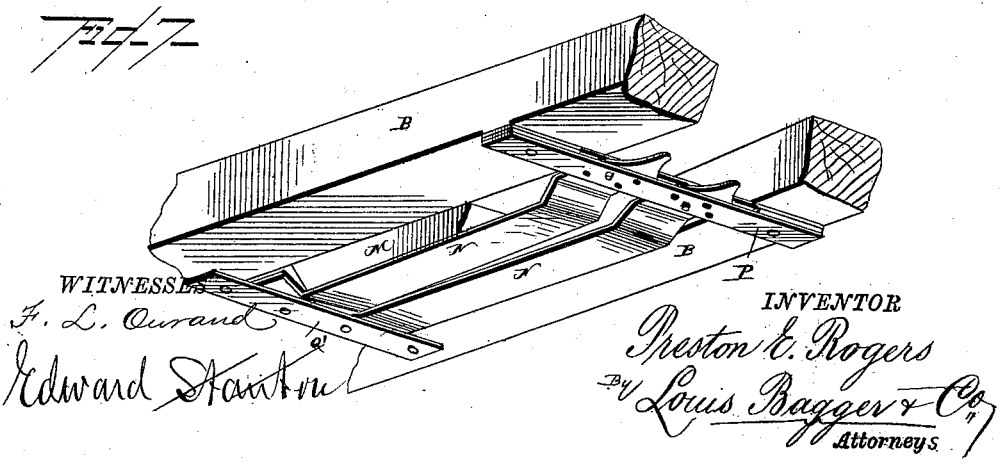
WITNESSES
F. L. Ourand
Edward Stanton
INVENTOR
Preston E. Rogers
By Louis Bagger & Co.
Attorneys

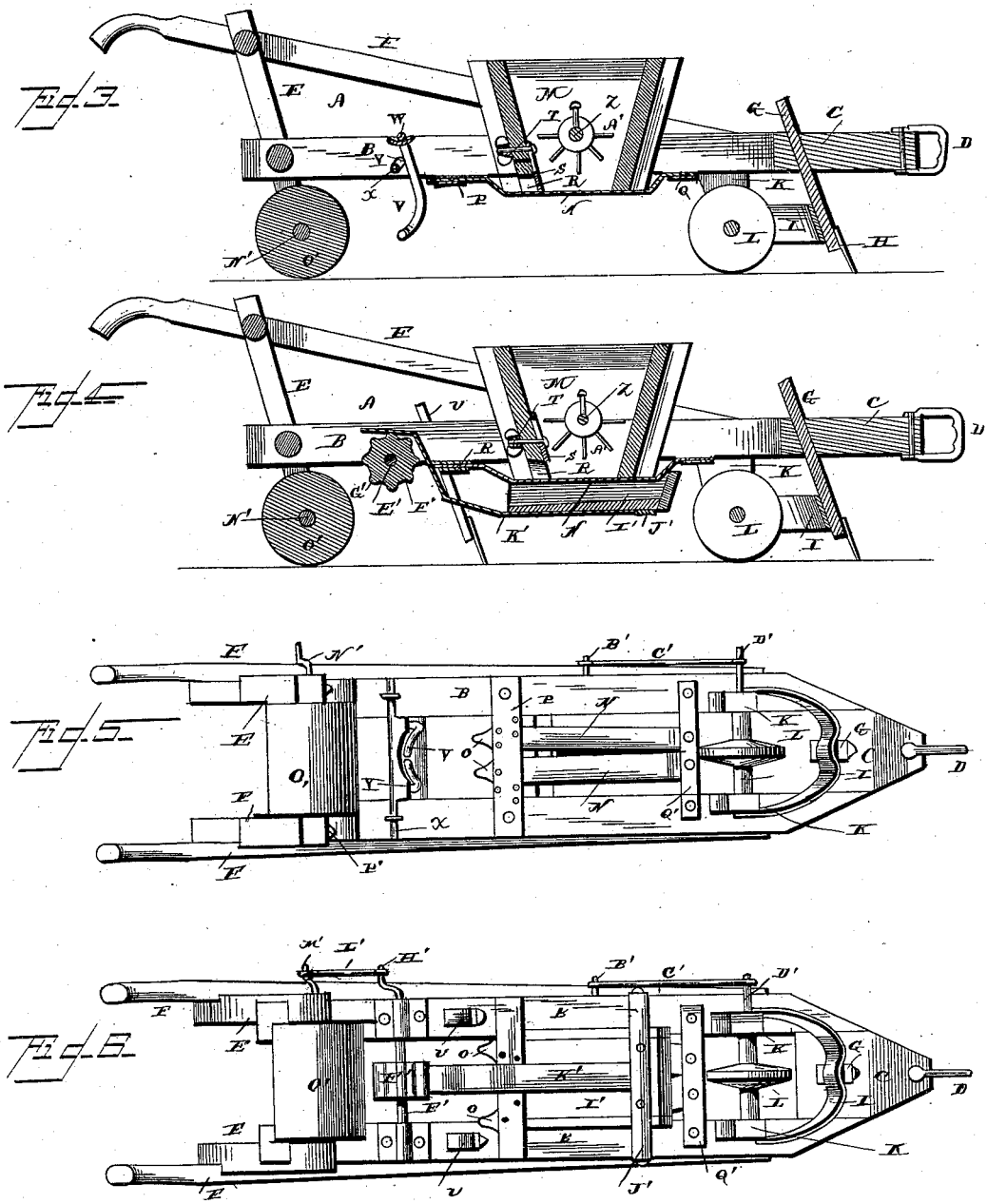

UNITED STATES PATENT OFFICE.

PRESTON EVANDER ROGERS, OF MULLIN'S DEPOT, SOUTH CAROLINA.

SEEDING-MACHINE.

SPECIFICATION forming part of Letters Patent No. 334,396, dated January 12, 1886.

Application filed October 17, 1885. Serial No. 180,186. (No model.)

*To all whom it may concern:*

Be it known that I, PRESTON E. ROGERS, a citizen of the United States, and resident of Mullin's Depot, in the county of Marion and State of South Carolina, have invented certain new and useful Improvements in Seeding-Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved seeding-machine, showing it adjusted for sowing cotton-seed, peas, or similar seed. Fig. 2 is a side view showing it adjusted for distributing fertilizer material. Figs. 3 and 4 are respectively longitudinal vertical sections of Figs. 1 and 2. Figs. 5 and 6 are bottom views of the two forms of my machine; and Fig. 7 is a perspective detail view of the bottom of the seed-box, showing the means for adjusting the quantity of seed sown.

Similar letters of reference indicate corresponding parts in all the figures.

My invention has relation to machines for sowing seed and fertilizing material; and it consists in the improved construction and combination of parts of a machine which may be converted from a machine for sowing cotton-seed, rice, peas, or similar seed to a machine for distributing fertilizing material, as hereinafter more fully described and claimed.

In the accompanying drawings, the letter A indicates a frame, consisting of two longitudinal sills, B B, connected at their forward ends by the beam C, which is provided at its forward end with a clevis, D, for the attachment of the draft, while the rear ends of the sills are provided with standards E E, extending above and below the sills and supporting the inclined handles F F at their upper ends. A standard, G, is secured in the beam, and a cultivator-shovel or opening-blade, H, is secured at its lower end, while a shield, I, is secured to the forward side of the standard, having its ends J J bent inward and secured into two downwardly-projecting standards, K K, between which the opening-disk L is journaled, having its shaft turning with its ends in bearings in the lower ends of the said standards. The shield I has its lower edge extending to a distance above the point of the opening-blade, so that it will spread the soil, forming a bed, while the opening-blade will open a furrow in the middle of the said bed, which furrow will be still more opened and have its sides compressed by the opening-disk, which has a sharp edge, increasing in thickness toward its center.

The seed-box M tapers toward its bottom, and the said bottom is composed of two flat plates or arms, N N, pivoted at their forward ends to swing in a horizontal plane, and having their rear ends perforated, provided with handles O, and sliding under a perforated cross plate or strip, P, where the rear ends of the pivoted plates may be adjusted upon pins Q, with their edges farther apart or closer together, according to the quantity of seed desired to be sown. The lower edge of the rear side of the seed-box is cut away, as shown at R, and a slotted slide, S, may cover this aperture with its lower end, its slotted upper end sliding upon a set-screw, T, upon the rear side of the seed-box.

Two standards, U U, having suitable shovels, are secured to the sills to the rear of the seed-box, and a coverer, consisting of two arms, V V, curved inward at their lower ends, is pivoted with its upper cross-piece, W, upon the upper sides of the sills, and has a transverse shaft, X, bearing with cams Y Y against the rear sides of the arms, the said shaft and cams serving to force the coverer more or less forward.

A shaft, Z, is journaled transversely in the lower end of the seed-box, and has a number of stirring-fingers, A', upon it, which serve to stir up the seed or fertilizing material in the box, and the said shaft has a crank, B', at one end, which is connected by means of a connecting-rod, C', to a crank, D', upon the shaft of the opening-disk, so that the stirrer-shaft may be rocked when the opening-disk is revolved. The cranks and the connecting-rod may be dispensed with and sprocket-wheels and chains substituted, when the stirrer-shaft will be revolved.

A shaft, E', is journaled in bearings in the sills to the rear of the coverer, and has a disk, F', secured upon it, the said disk hav a series of knobs or projections, G', upon its periphery, and one end of the shaft is formed into a crank, H'.

A shoe, I', is suspended under the bottom of the seed-box when the machine is used as a fertilizer-distributer, by means of two straps, J', buttoned to the sides of the seed-box and secured to the forward end of the shoe, and the rear end of the shoe is provided with an upwardly and rearwardly curved bar, K', the free rear end of which rests upon the disk having the knobs, so that the bar and the shoe may be shaken when the said disk is revolved or rocked, the knobs striking the bar.

The crank upon the shaft having the disk with the knobs is connected by means of a connecting-rod or pitman, L', to a crank, M', upon a shaft, N', journaled between the lower ends of the rear standards, and a roller, O', is secured upon the said shaft, while the ends of the standards are provided with shovel-blades P', which will throw the dirt in under the roller, causing it to form a bed.

When the machine is used for sowing seed, the shoe is dispensed with, and the disk having the knobs is preferably also removed, and when the machine is used for distributing fertilizing material, the coverer is dispensed with and the shoe and its disk placed in position.

It will be seen that the opening-blade will open a furrow, and the shield will level a bed, which will have the furrow in its middle opened still further and compacted by the opening disk, whereupon the seed or fertilizer will be sown and covered either by the coverer or by the coverer-shovels, which will serve to throw the dirt toward the bed, when at last the top of the bed will be leveled, and the sides of the bed thrown up by means of the roller between the rear uprights and the blades at their lower ends.

The stirrer-fingers may be arranged differently, according to the different kinds of seed which are to be sown, or if the machine is to be used for fertilizer, the fertilizer requiring more crushing and stirring, and consequently requiring the teeth to be arranged to intersect each other, while for cotton-seed more stirring is needed than for rice, peas, or similar smooth seed.

Having thus described my invention, I claim and desire to secure by Letters Patent of the United States—

1. In a seeding-machine, the combination of the frame having two standards at the forward end, a standard secured forward of the standards and provided with an opening-blade, and a shield secured to the forward side of the opening-standard and with its inwardly-bent ends in the sides of the two standards, having its lower edge above the point of the opening-blade, as and for the purpose shown and set forth.

2. In a seeding-machine, the combination of a coverer consisting of a rocking shaft having two rearwardly-curved arms bent inward at their lower ends with a shaft having cams bearing against the rear sides of the upper portions of the coverer-arms, as and for the purpose shown and set forth.

In testimony that I claim the foregoing as my own I have hereunto affixed my signature in presence of two witnesses.

PRESTON EVANDER ROGERS.

Witnesses:
S. E. SMITH,
J. M. ROGERS.